US007006826B2

(12) United States Patent
Cao et al.

(10) Patent No.: US 7,006,826 B2
(45) Date of Patent: Feb. 28, 2006

(54) METHOD OF INFORMING MOBILE USER TERMINALS CAMPED ON A CELL OF A BASE STATION THAT A SERVICE IS UNAVAILABLE, A BASE STATION, AND A NETWORK

(75) Inventors: Qiang Cao, Swindon (GB); Patrick Georges Venceslas Charriere, Tetbury (GB); Seau Sian Lim, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 356 days.

(21) Appl. No.: 10/400,422

(22) Filed: Mar. 27, 2003

(65) Prior Publication Data

US 2003/0195003 A1 Oct. 16, 2003

(30) Foreign Application Priority Data

Apr. 10, 2002 (EP) ................................ 02252547

(51) Int. Cl.
*H04Q 7/20* (2006.01)
*H04L 12/66* (2006.01)

(52) U.S. Cl. ........................ 455/438; 455/439; 370/352

(58) Field of Classification Search ................ 455/438, 455/439, 435.1, 427, 450, 12.1, 452.1, 426.1; 370/352–354

See application file for complete search history.

(56) References Cited

U.S. PATENT DOCUMENTS

| | | | | |
|---|---|---|---|---|
| 5,581,802 A | 12/1996 | Erickson et al. | ........... | 455/33.1 |
| 5,613,213 A | 3/1997 | Naddell et al. | ............ | 455/54.1 |
| 2002/0085537 A1 * | 7/2002 | Carlsson et al. | ............ | 370/352 |
| 2002/0174434 A1 * | 11/2002 | Lee et al. | ...................... | 725/74 |
| 2003/0040314 A1 * | 2/2003 | Hogan et al. | ............... | 455/435 |
| 2003/0050072 A1 * | 3/2003 | Noerpel et al. | ............. | 455/452 |

FOREIGN PATENT DOCUMENTS

| | | |
|---|---|---|
| WO | WO 00/44189 A | 7/2000 |
| WO | WO 01/03/463 A1 | 1/2001 |
| WO | WO 01/15468 A1 | 3/2001 |

* cited by examiner

*Primary Examiner*—Benny Q. Tieu

(57) ABSTRACT

A method is provided of informing mobile user terminals (12) camped on a cell of a base station (8) of a radio telecommunications network that a service is unavailable, such that a mobile user terminal (12) desirous of said service is handed over to another cell which provides said service. The method comprises informing the terminals (12) that selectably at least one of circuit-switched services (4) and packet-switched services (6) are unavailable.

4 Claims, 1 Drawing Sheet

METHOD OF INFORMING MOBILE USER TERMINALS CAMPED ON A CELL OF A BASE STATION THAT A SERVICE IS UNAVAILABLE, A BASE STATION, AND A NETWORK

CROSS REFERENCE TO RELATED APPLICATION

This application claims priority of European Application No. 02252547.1 filed on Apr. 10, 2002.

1. Technical Field

The present invention relates to networks, telecommunications and wireless communications.

2. Background of the Invention

When a telecommunications network is not functioning properly or its operator wants to restrict use of the network, for example for maintenance purposes, the network indicates to user terminals not to access the network. Where user terminals are mobile (e.g., in a wireless network rather than being fixed line handsets), restriction is made on a per cell basis, where a cell is a geographical area differentiated by frequency and codes from the neighbouring cells. For example, in such a network each base station has (e.g., three) directional antennas each transmitting in a corresponding (e.g., 120 degree) sector. Each base station thus has several cells in the sense of permitted combinations of sector and carrier frequency pair (one carrier uplink, one carrier downlink).

In telecommunications networks in accordance with the Third Generation Partnership Project 3GPP wideband code division multiple access W-CDMA standard, an indication is sent via the broadcast channel of a cell to indicate to users not to access the network in that cell. This is known as barring of a cell.

More specifically, in accordance with the 3GPP W-CDMA standard, when the network wants to bar a cell, it changes the cell bar status of a cell to 'barred' in system information broadcast SIB (of Type 3 and/or 4) and broadcasts that on the broadcast channel of the cell. Any users camping on the cell (e.g., those users in idle mode or inactive connected mode) are forced to perform a cell re-selection to find a new cell to camp on. The network bars a cell if any part of the network (e.g., radio system, circuit switched service system, packet switched service system, or interfaces to those subsystems) serving that cell is not functioning properly.

SUMMARY OF THE INVENTION

The present invention provides a method of informing mobile user terminals camped on a cell of a base station of a communications network, such as a radio telecommunications network, that a service is unavailable such that a mobile user terminal desirous of the service is handed over to another cell which provides said service characterised in that the method comprises informing the terminal(s) that selectably at least one of circuit-switched services and packet-switched services are unavailable.

Advantageous embodiments of the invention provide a simple solution by adding an extra indication in the cell bar status to indicate to the user which service is barred by the network. An advantage is to allow an operator to bring down one service type, e.g., for repair and maintenance purposes, without affecting the other. In other words barring can be done in a service selective way. In consequence, network operators will not lose revenue, and users will have a route for notifying reduced service/filing a complaint still available. Importantly emergency call can still be made by a user by using the unaffected service.

In contrast, known approaches as described in the Background section do not allow this differentiation as to services. In the known approaches when a cell is barred, both services will be brought down within that cell. If the radio network is down, it is fine to perform cell barring. However, if it is any other part of the system, it cell barring will bring down unaffected system too. This is undesirable to the user wanting to use the service from the unaffected service system. It is also undesirable to the network operator in view of the resulting lost revenue.

Advantageously, the terminals may be informed in a message on a downlink broadcast channel. The message may include an information element representative of any of four states: unbarred, circuit-switched services barred, packet-switched services barred, both circuit-switched services and packet-switched services barred. Advantageously, the radio telecommunications network is a wideband-code division multiple access W-CDMA network, the terminals being informed in a system information broadcast SIB message sent on the broadcast channel. Advantageously, the terminals are in idle mode or inactive connected mode, the terminals being informed in a Type 3 SIB message and/or Type 4 SIB message.

The present invention also provides a radio telecommunications network comprising a base station operative to inform mobile user terminals camped on a cell of the base station that a service is unavailable such that a mobile user terminal desirous of said service is handed over to another cell which provides said services characterised in that the base station comprises means operative to inform the terminals that selectably at least one of circuit-switched services and packet-switched services are unavailable. Advantageously, the base station informs the terminals in a message on a downlink broadcast channel. Advantageously, the message includes an information element representative of any of four states: unbarred, circuit-switched services barred, packet-switched services barred, both circuit-switched services and packet-switched services barred. Advantageously, the radio telecommunications network is a wideband-code division multiple access W-CDMA network, the terminals being informed in a system information broadcast SIB message sent on the broadcast channel. Advantageously, the terminals are in idle mode or inactive connected mode, the terminals being informed in a Type 3 SIB message and/or Type 4 SIB message.

The present invention also provides a base station of a radio telecommunications network operative to inform mobile user terminals camped on a cell of the base station that a service is unavailable such that a mobile user terminal desirous of said service is handed over to another cell which provides said services characterised in that the base station comprises means operative to inform the terminals that selectably at least one of circuit-switched services and packet-switched services are unavailable.

BRIEF DESCRIPTION OF THE DRAWINGS

The present invention will be better understood from reading the following description of non-limiting embodiments, with reference to the attached drawings, wherein below.

Figure 1:
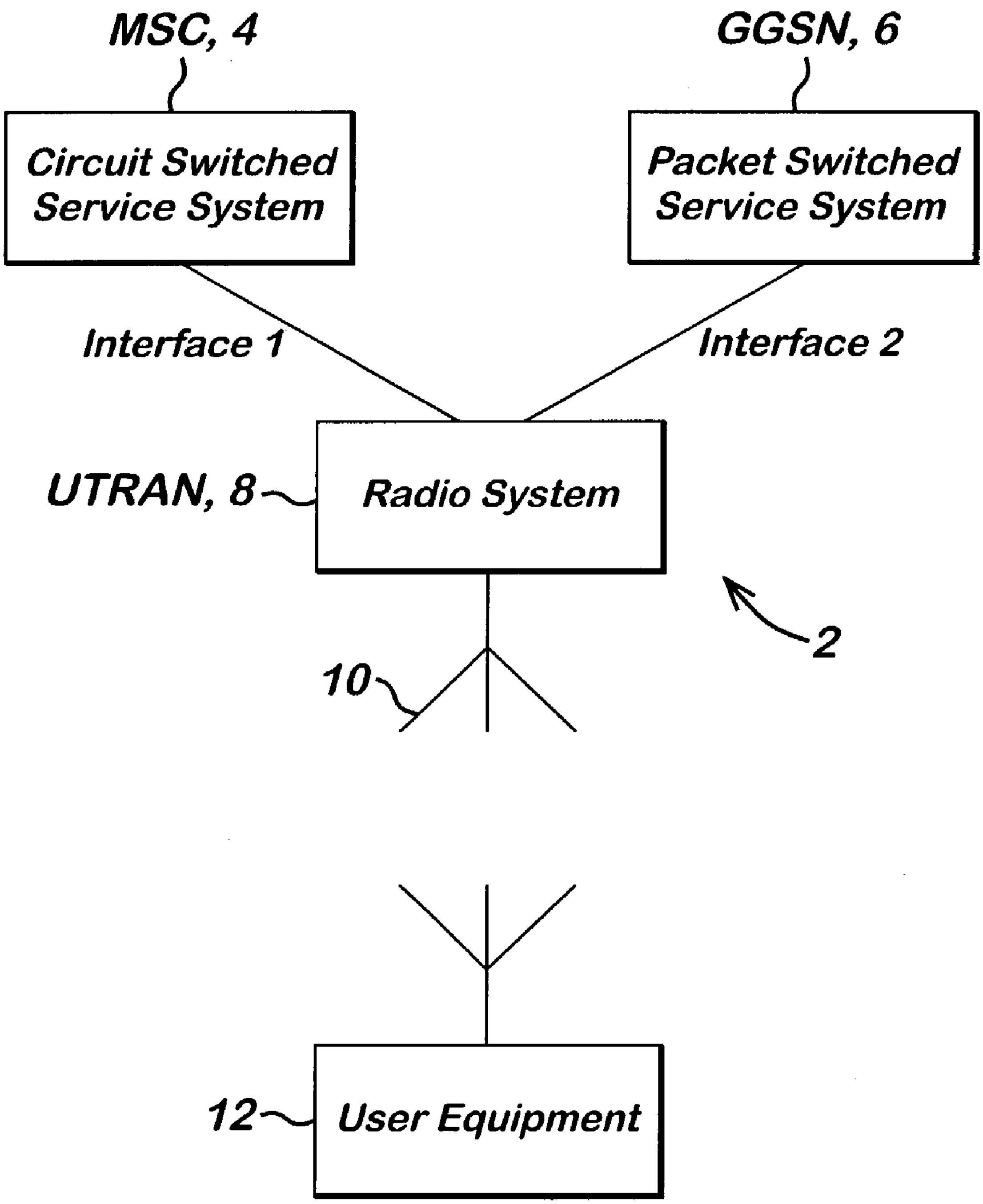
FIG. 1 is a diagram illustrating a network including a base station in call connection with a mobile user terminal.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

A preferred network 2 is shown in FIG. 1. There are two service type systems in a network. One system 4 for circuit switched service and another system 6 is for packet switched service. Examples of circuit switched services are ISDN, voice etc. Examples of packet switched services are web browsing, VoIP etc. The network also includes a radio system 8, which provides the means of sending data over air. Using 3GPP terminology, the circuit switched service system 4 is the Mobile Switching Center (MSC), the packet switched service system 6 is the Serving GPRS Support Node (SGSN), and the radio system 8 is Universal Mobile Telecommunications System UMTS Terrestrial Radio Access Network (UTRAN). The UTRAN 8 consists of one or more base stations (NodeB), each having several directional antennas 10 (one of which is shown in FIG. 1) and being under the control of a radio network controller RNC. The circuit switched service system 4 is connected to the radio system 8 by an interface denoted Interface 1 and Iu-CS. The packet switched service system 6 is connected to the radio system 8 by an interface denoted Interface 2 and Iu-PS. In FIG. 1, a mobile user terminal 12 (User Equipment, UE) is also shown.

A method is provided of barring particular types of service within cells to user terminals in idle mode or inactive connected mode. This is achieved by adding an additional (cell-reserving) information element in the system information broadcast SIB indicating that the cell is reserved for either circuit-switched or packet-switched communications. If this is not set, it is assumed that any mobile user terminal 12 camping on the cell is allowed to establish both circuit and packet services.

The additional information element is an indication of cell bar status in binary (enumerated) form, the possible states being: Unbarred, Barred Packet Service, Barred Circuit Service, Both Barred). The additional information element is provided in system information broadcast SIB Type 3 and 4 cell reservation extensions. System information broadcast SIB Type 3 messages are for idle-mode user terminals, (and also inactive-connected-mode user terminals if SIB Type 4 massages are not present). System information broadcast SIB Type 4 messages are for inactive-connected-mode users only.

In further embodiments other ways of encoding or communicating the cell bar status are possible.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. It is therefore contemplated that the appended claims will cover any such modifications or embodiments as fall within the true scope of the invention.

What is claimed is:

1. A method of informing mobile user terminals camped on a cell of a base station of a radio telecommunications network that a service is unavailable such that a mobile user terminal desirous of the service is handed over to another cell for providing the service, the network comprising a circuit-switched system providing circuit-switched services and a packet-switched system providing packet-switched services, the method comprising:

informing the user terminals that selectably at least one of the circuit-switched system and the packet-switched system are unavailable, wherein the step of informing comprises informing the terminals in a message on a downlink broadcast channel, wherein the message comprises an information element selectably representative of any of the following states:

an unbarred state, all circuit-switched services barred state, all circuit-switched services barred state, and both all circuit-switched services barred and all circuit-switched services barred state wherein the telecommunications network comprises a wideband-code division multiple access W-CDMA network, and the terminals being informed in a system information broadcast SIB message sent on the broadcast channel.

2. The method according to claim 1, wherein the terminals are in idle mode or inactive connected mode, the terminals being informed in a Type 3 SIB message and/or Type 4 SIB message.

3. A radio telecommunications network comprising a base station operative to inform mobile user terminals camped on a cell of the base station that a service is unavailable such that a mobile user terminal desirous of said service is handed over to another cell which provides said services, the network comprising a circuit-switched system providing circuit-switched services and a packet-switched system providing packet-switched services, wherein the base station comprises means operative to inform the terminals that selectably at least one of circuit-switched system and the packet-switched services are unavailable, wherein the base station informs the terminals in a message on a downlink broadcast channel, wherein the message includes an information element selectably representative of any of four states: unbarred, all circuit-switched services barred, all packet-switched services barred, both all circuit-switched services and all packet-switched services barred, and wherein the telecommunications network is a wideband-code division multiple access W-CDMA network, and the terminals being informed in a system information broadcast SIB message sent on the broadcast channel.

4. A base station of a radio telecommunications network operative to inform mobile user terminals camped on a cell of the base station that a service is unavailable such that a mobile user terminal desirous of said service is handed over to another cell which provides said services, the network comprising a circuit-switched system providing circuit-switched services and a packet-switched system providing packet-switched services, the base station comprises means operative to inform the terminals that selectably at least one of circuit-switched system services and the packet-switched system are unavailable, wherein the base station informs the terminals in a message on a downlink broadcast channel, wherein the message includes an information element selectably representative of any of four states: unbarred, all circuit-switched services barred, all packet-switched services barred, both all circuit-switched services and all packet-switched services barred, and wherein the telecommunications network is a wideband-code division multiple access W-CDMA network, and the terminals being informed in a system information broadcast SIB message sent on the broadcast channel.

* * * * *